United States Patent
Sasaki et al.

(10) Patent No.: US 6,172,440 B1
(45) Date of Patent: Jan. 9, 2001

(54) MOTOR

(75) Inventors: Toyoshige Sasaki, Yokohama; Chikara Aoshima, Zama, both of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/290,408

(22) Filed: Apr. 13, 1999

(30) Foreign Application Priority Data

Apr. 17, 1998 (JP) ................................. 10-124051

(51) Int. Cl.[7] ................................................. H02K 37/00
(52) U.S. Cl. .................. 310/156; 310/49 R; 310/254; 310/257; 310/266
(58) Field of Search .................. 310/257, 156, 310/49 R, 254, 112, 266, 180, 181

(56) References Cited

U.S. PATENT DOCUMENTS

| | | | |
|---|---|---|---|
| 4,009,406 | * 2/1977 | Inariba | 310/164 |
| 4,754,183 | * 6/1988 | Gerber | 310/156 |
| 4,823,038 | * 4/1989 | Mizutani et al. | 310/257 |
| 5,283,487 | * 2/1994 | Oki et al. | 310/49 R |
| 5,384,506 | 1/1995 | Aoshima | 310/49 R |
| 5,831,356 | 11/1998 | Aoshima | 310/49 R |
| 5,925,945 | 7/1999 | Aoshima | 310/49 R |
| 5,969,453 | * 10/1999 | Aoshima | 310/156 |

* cited by examiner

*Primary Examiner*—Burton Mullins
(74) *Attorney, Agent, or Firm*—Fitzpatrick, Cella, Harper & Scinto

(57) ABSTRACT

A rotor magnet includes a first polarized layer alternately polarized into different poles while being circumferentially divided into n parts, and a second polarized layer alternately polarized into different poles. An advance phase angle as θ1 with respect to the first polarized layer is set and the magnet is circumferentially divided into n parts. First and second coils are disposed in an axial direction of the rotor magnet. A first outer magnetic pole and a first inner magnetic pole, which are a first stator excited by the first coil, are opposed to an outer peripheral surface and an inner peripheral surface of the rotor, and a second outer magnetic pole, and a second inner magnetic pole which are a second stator excited by the second coil, are opposed to an outer peripheral surface and an inner peripheral surface of the rotor. When a lag phase angle of the second stator with respect to the first stator is set to θ2, the first and second polarized layers and the first and second stators are positioned so that θ1 +θ2 are larger than 180/n degrees. As a result, the power output of the motor is enhanced.

11 Claims, 12 Drawing Sheets

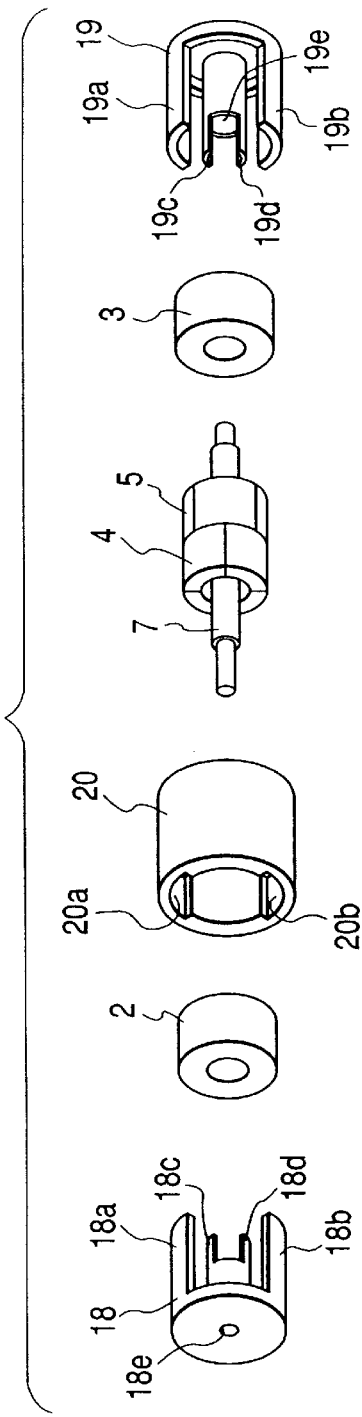
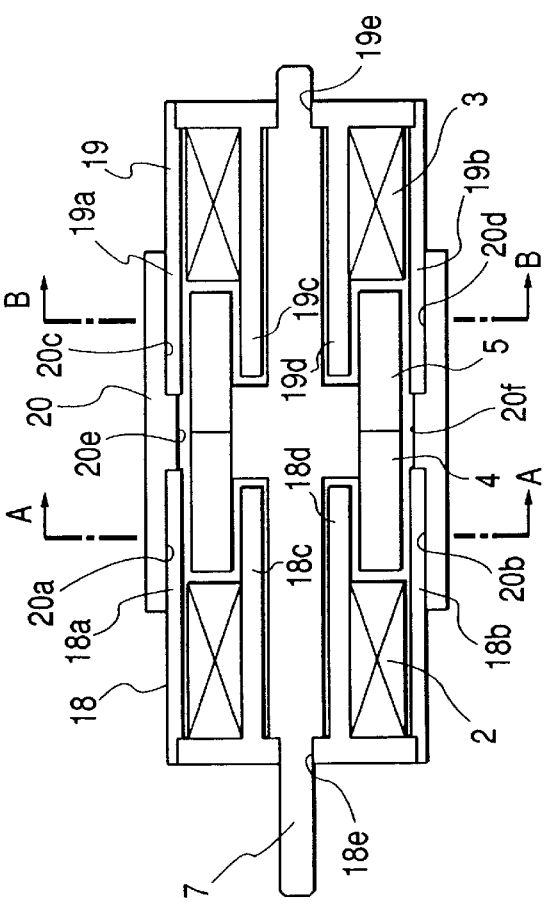

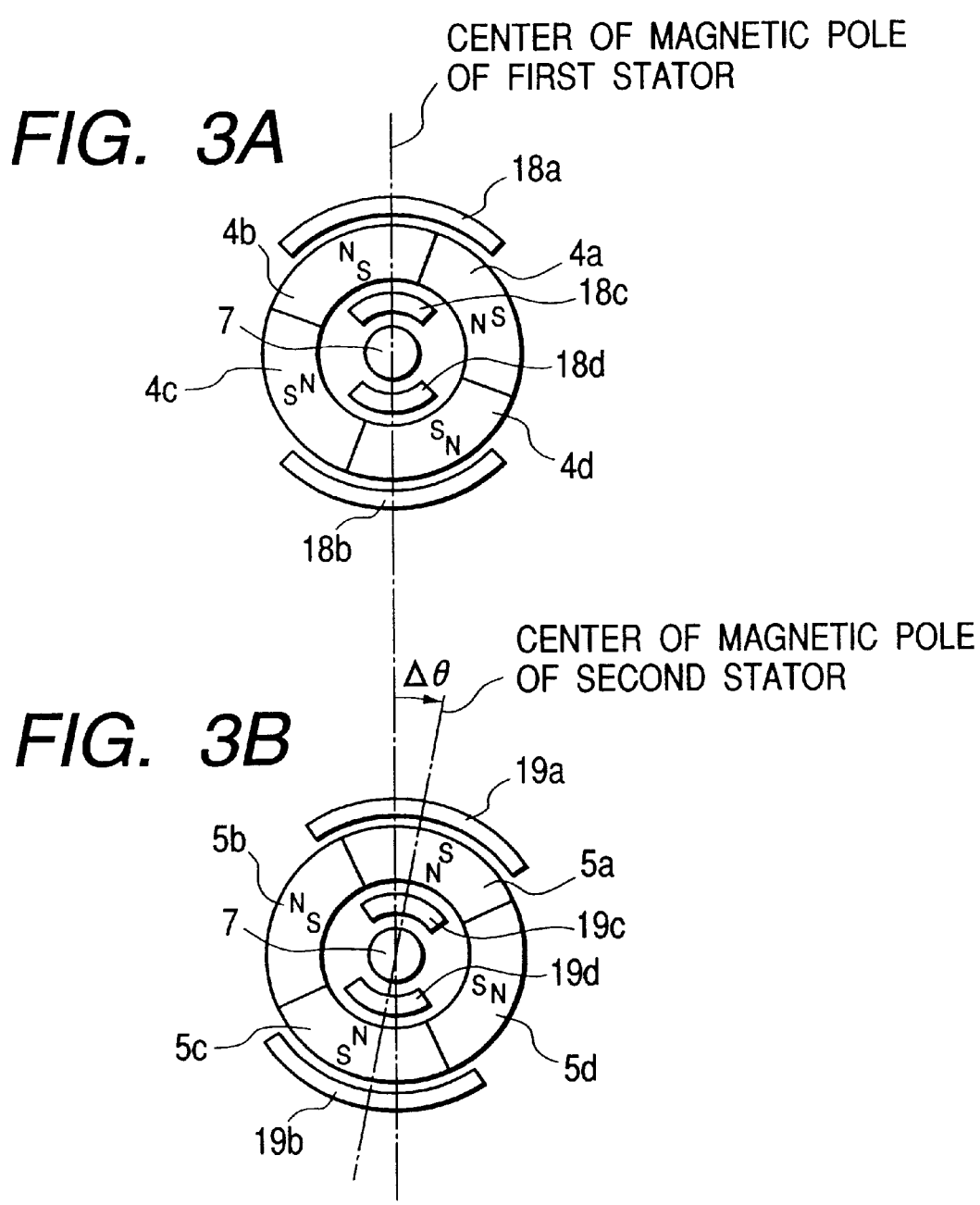

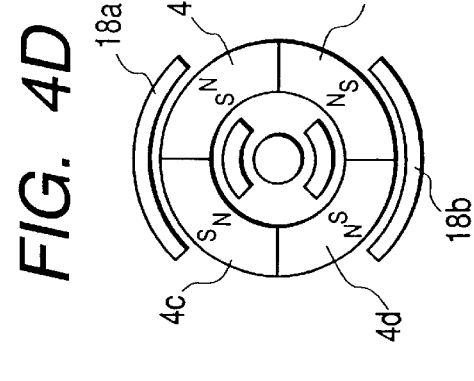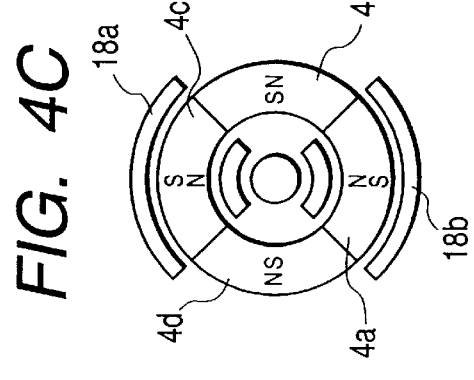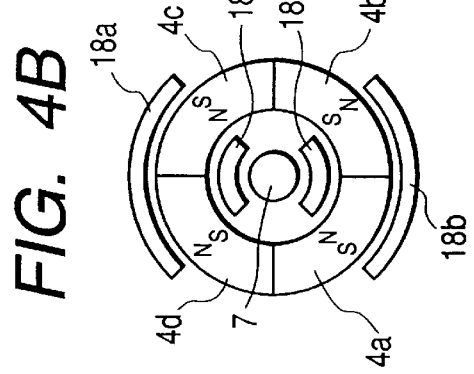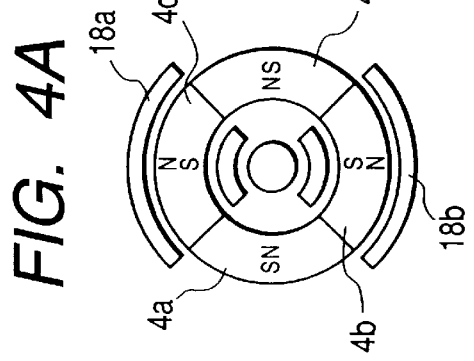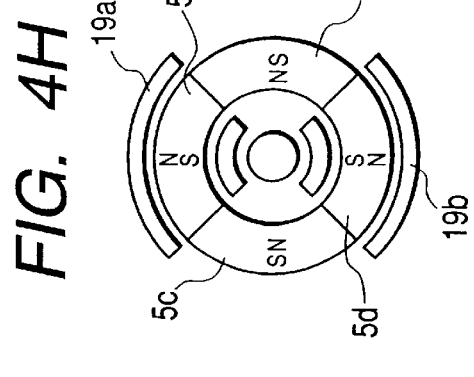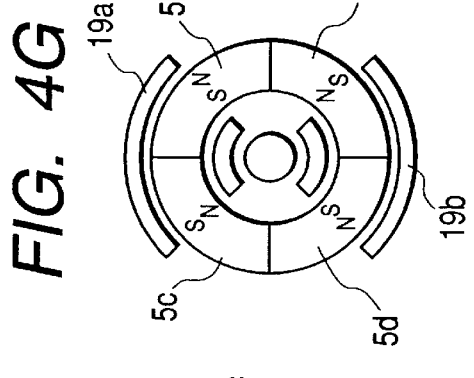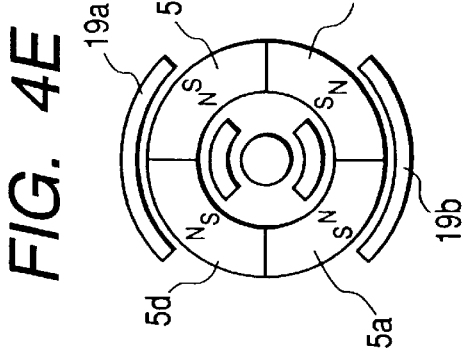
FIG. 4A FIG. 4B FIG. 4C FIG. 4D FIG. 4E FIG. 4F FIG. 4G FIG. 4H

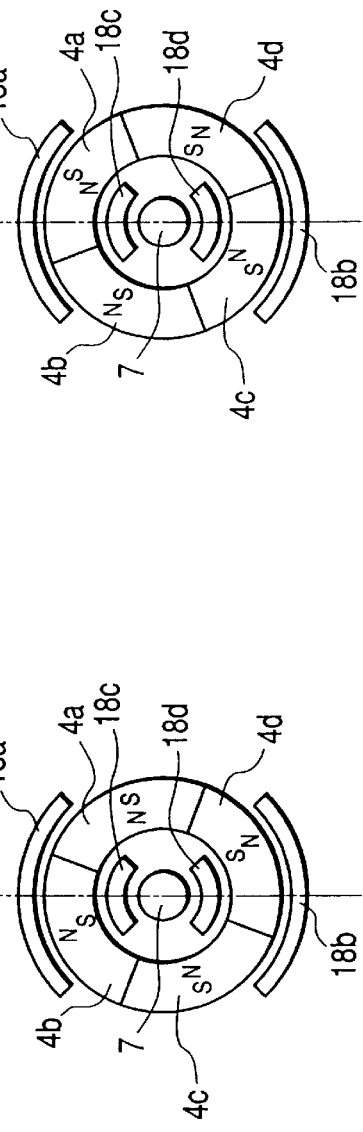
FIG. 8A
FIG. 8B
(1) STABLE POINT 1
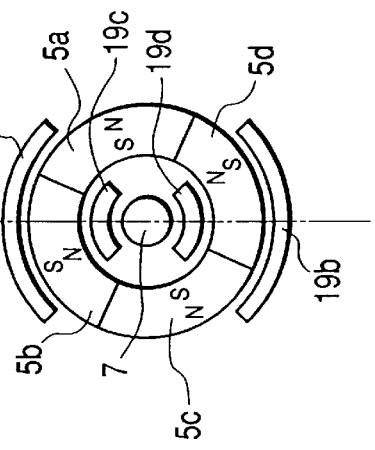
FIG. 8C
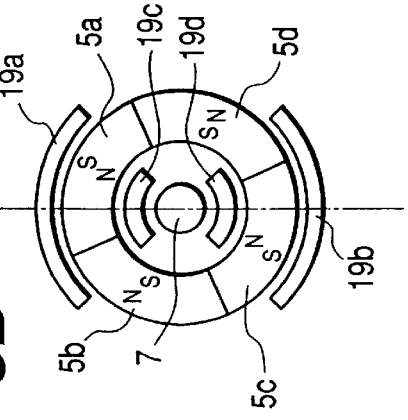
FIG. 8D
(2) STABLE POINT 2

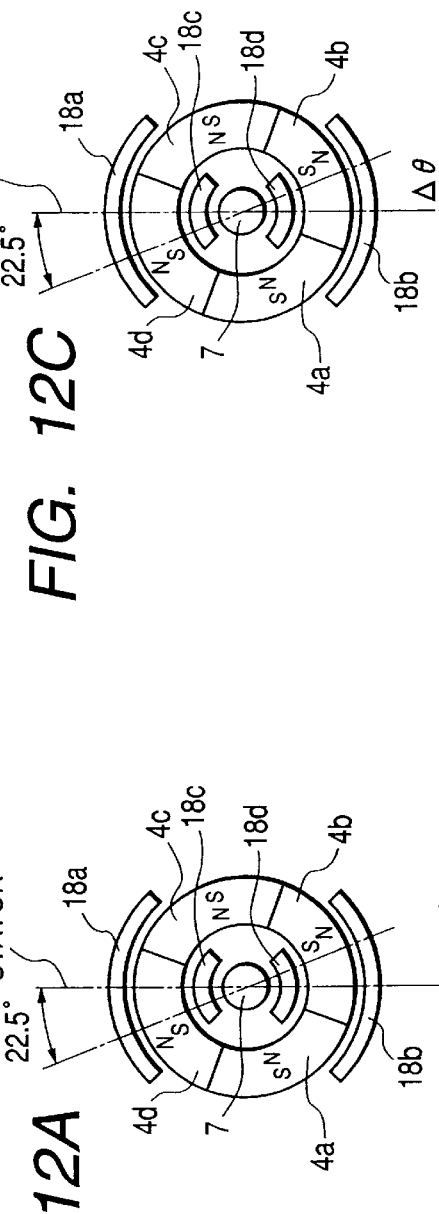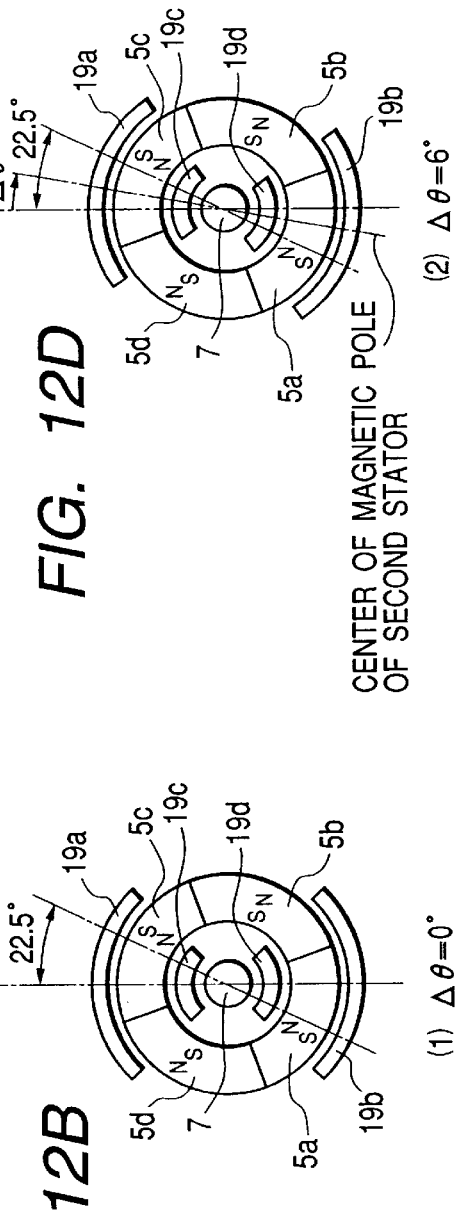

(1) Δθ=0°
(2) Δθ=6°

ROTATIONAL POSITION OF ROTOR = 67.5 DEGREE

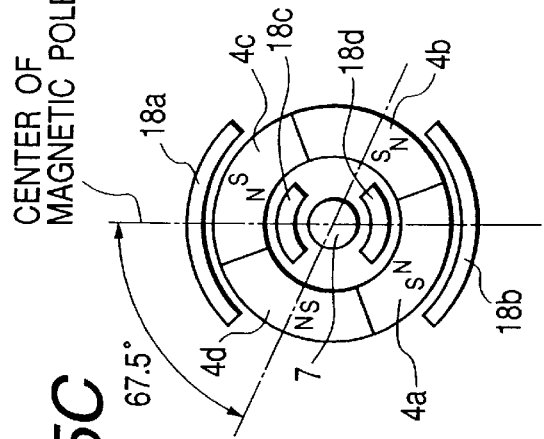
FIG. 15C
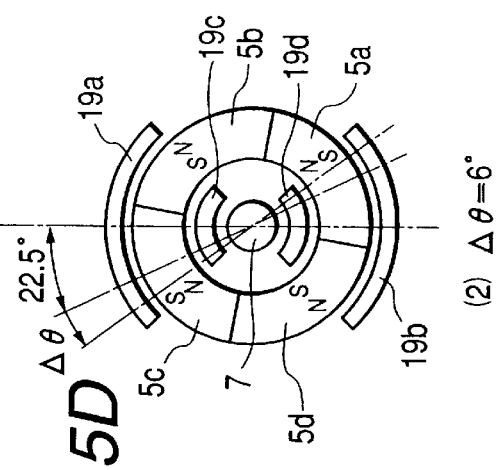
FIG. 15D
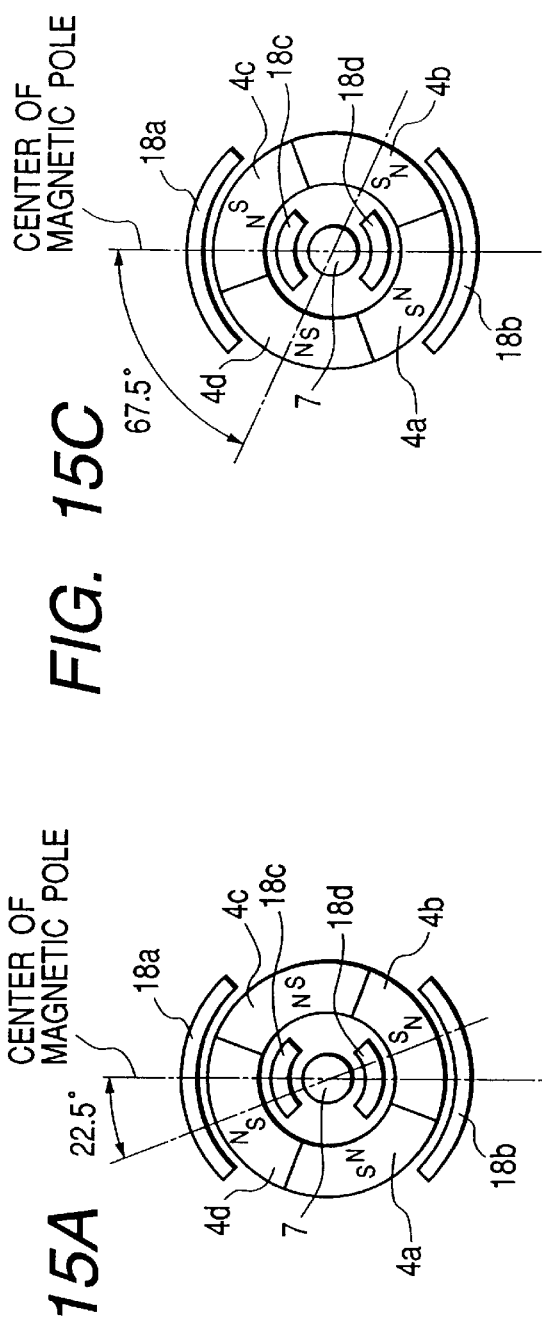
FIG. 15A
FIG. 15B

MOTOR

BACKGROUND OF THE INVENTION

1. Field of the Invention

The present invention relates to an ultra-compact type motor with the high power output.

2. Related Background Art

A motor formed as a compact type motor is conventionally well known as, for example, a compact cylindrical step motor, as shown in FIG. 16. A stator 102 of the step motor is arranged in a manner that a stator coil 105 is coaxially wound on a bobbin 101 fixed and sandwiched in an axial direction between two stator yokes 106, and stator gear teeth 106a and 106b are alternately disposed on the stator yoke 106, on the inner peripheral surface of the bobbin 101 in the circumferential direction, and that the stator yoke 106, integrated to the stator teeth 106a or 106b, is fixed to the case 103.

A flange 115 and a bearing 108 are fixed to one of two sets of cases 103 and another bearing 108 is fixed to the outer part of the cases 103. A rotor 109 includes a rotor magnet 111 fixed to a rotor shaft 110 and the rotor magnet 111 defines a radial gap portion together with the stator yoke 106a of the stator 102. Further, the rotor shaft 110 is rotatably supported between two bearings 108.

However, the above-mentioned conventional compact step motor has the disadvantage of having large outer dimensions since the case 103, the bobbin 101, the stator coil 105, the stator yoke 106 and the like are coaxially disposed around the periphery of the rotor 109. Further, the magnetic flux generated by energization of the stator 105 mainly passes through an end face 106a1 of the stator teeth 106a and an end face 106b1 of the stator teeth 106b as shown in FIG. 17, so that it does not effectively act on the rotor magnet 111, whereby the power output of the motor does not become higher.

The present inventors proposed a motor in which such problems had been overcome, as U.S. Pat. No. 5,831,356. The proposed motor has a cylindrical rotor comprised of a permanent magnet divided into equal parts in a circumferential direction and alternately polarized to different magnetic poles. A first coil, a rotor, and a second coil are disposed in an axial direction of the rotor in this order and a first outer magnetic pole and a second magnetic pole, which are excited by the first coil, are opposed to the outer and inner peripheral surfaces of the rotor, and a second outer magnetic pole and a second magnetic pole, which are excited by the second coil, are opposed to the outer and inner peripheral surfaces of the rotor. A rotary shaft that is a rotor shaft may be removed from within the cylindrical permanent magnet.

Thus configured motors may have a high power output and small outer dimensions. However, machining of the magnetic pole teeth is difficult because of the small diameter of an outer magnetic pole. Further, a small-diametered motor free from vibration and having a stable power output are required.

Thus, the present inventors recently proposed a motor in which the inner magnetic pole has a shape with improved machinability in U.S. patent application Ser. No. 08/994,994. Further, the present inventors proposed a rotor in which output transmission means, such as a gear and pulley, is easily mounted on a rotary shaft with a small diameter, in U.S. patent application Ser. No. 09/022,474. Furthermore, it has been required to obtain a stable and high power motor that is configured as an ultra-compact type motor.

SUMMARY OF THE INVENTION

Taking the above-mentioned problems into consideration, an object of the present invention is to provide an ultra-compact type motor configured in a manner that high power output can be stably obtained.

Another object of the present invention is to improve the output performance of a motor by setting the phase shift of a second polarized layer with respect to a first polarized layer of a magnet and the phase shift of a second stator with respect to a first stator.

Other objects of the present invention will become apparent from concrete examples described below.

BRIEF DESCRIPTION OF THE DRAWINGS

FIG. 1 is an exploded perspective view of a motor according to the present invention;

FIG. 2 is a cross-sectional view of the assembled motor shown in FIG. 1;

FIGS. 3A and 3B are views showing the positional relationships between a rotor and a stator when a phase difference Δθ is provided between the first and second stators according to Example 1 of the present invention.

FIGS. 4A, 4B, 4C, 4D, 4E, 4F, 4G and 4H are views explaining the rotation operation of the rotor of the motor shown in FIG. 2;

FIGS. 8A, 8B, 8C and 8D are views showing the positional relationships between a rotor and a stator at a stable point of the motor shown in FIG. 2;

FIGS. 12A, 12B, 12C and 12D are views showing the positional relationships between a rotor and stator when a phase difference Δθ is provided or not provided between the first and second stators;

FIGS. 15A, 15B, 15C and 15D are views showing the positional relationships between a rotor and a stator according to example 2 of the present invention;

Figure 5:
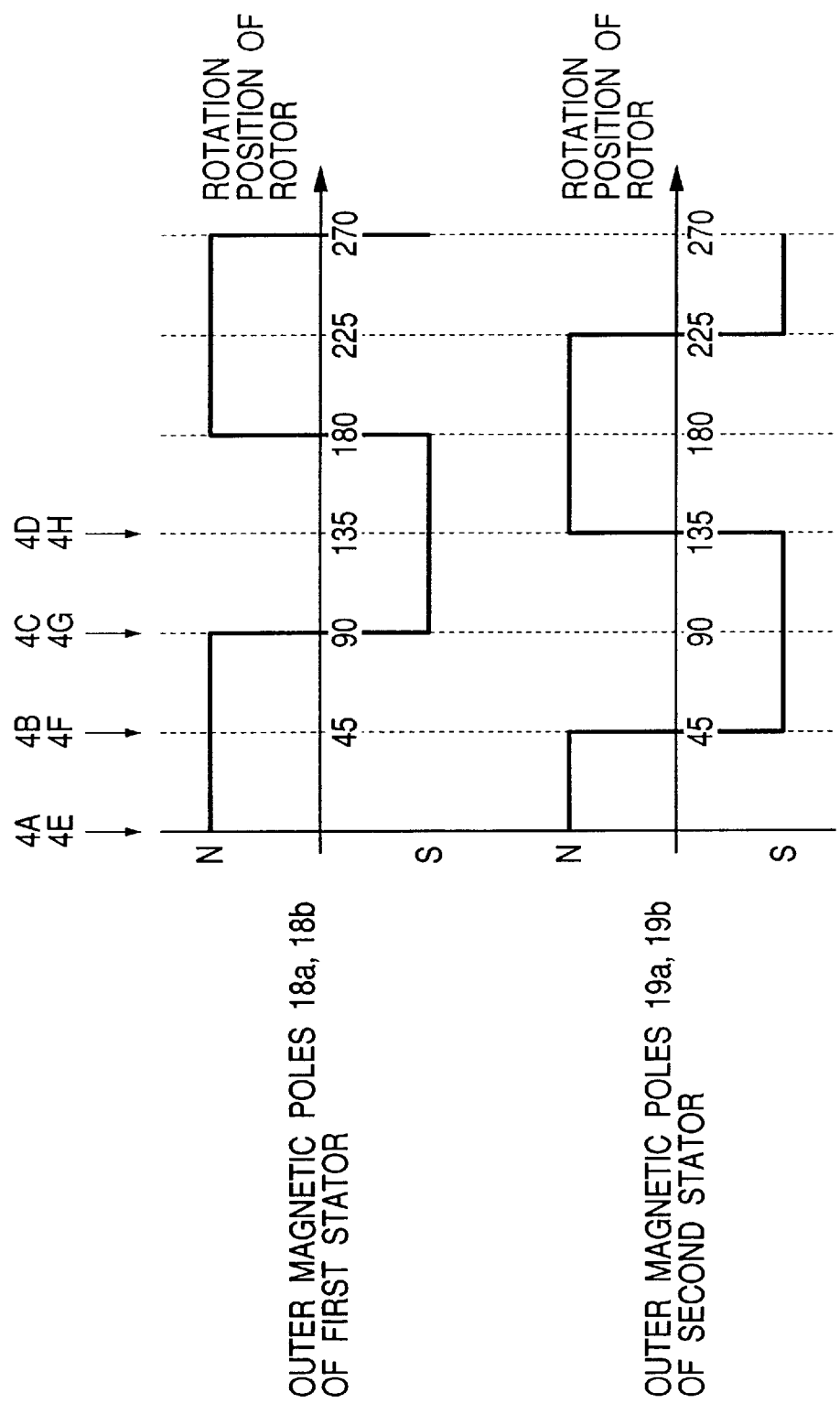
FIG. 5 is a view showing pole changes of the magnetic poles of the motor shown in FIG. 2.

DETAILED DESCRIPTION OF THE PREFERRED EMBODIMENTS Example 1

EXAMPLE 1

Example 1 of the present invention will be described below. First, the principle structure of a step motor according to the present invention will be described with reference to FIGS. 1, 2 and 4A to 4H. FIG. 1 is an exploded perspective view of a step motor according to the present invention, FIG. 2 is a cross-sectional view of the assembly of the motor shown in FIG. 1, and FIGS. 4A to 4H explain the rotational operation of the rotor of the motor shown in FIG. 2 and are cross-sectional views taken along the line A—A and cross-sectional views taken along the line B—B.

In FIGS. 1, 2 and 4A to 4H, the reference numeral 4 denotes a cylindrical magnet forming a rotor, in which the outer peripheral surface of the magnet is divided into n parts (4 equal parts in the present embodiment) in a circumferential direction to obtain first polarized layers 4a, 4b 4c and 4d where the S pole and N pole are alternately polarized. In this case the polarized layers 4a and 4c are polarized as the S pole and the polarized layers 4b and 4d are polarized as the N pole. Further, the inner peripheral surface of the magnet 4 is polarized to a different pole from the adjacent outer peripheral surface, the inner peripheral surfaces of the polarized layers 4a and 4c are polarized to the N pole and the inner peripheral surfaces of the polarized layers 4b and 4d are polarized to the S pole.

The reference numeral 5 denotes a cylindrical magnet forming a rotor like the reference numeral 4, in which the outer peripheral surface of the magnet is divided into n parts (4 equal parts in the present embodiment) in a circumferential direction to obtain first polarized layers 5a, 5b, 5c and 5d where the S pole and N pole are alternately polarized. In this case, the polarized layers 5a and 5c are polarized as the S pole and the polarized layers 5b and 5d are polarized as the N pole. Further, the inner peripheral surface of the magnet 5 is polarized to a different pole from the adjacent outer peripheral surface, the inner peripheral surfaces of the polarized layers 5a and 5c are polarized to the N pole and the inner peripheral surfaces of the polarized layers 5b and 5d are polarized to the S pole. The magnet 5 is disposed at the adjacent position to the magnet 4 in the horizontal direction to the central axis thereof so that the phase of the magnet 5 is circumferentially changed from that of the magnet 4 by 180/n degrees, that is 45°, in a counterclockwise direction (when the counterclockwise direction is defined as a positive direction, the phase is advanced by 45°).

The reference numeral 7 denotes an output shaft which is adhered to the magnets 4 and 5 of the rotor. The output shaft 7 and magnets 4 and 5 form the rotor. The reference numerals 2 and 3 denote cylindrical coils respectively. The coils 2 and 3 are coaxially positioned with the magnets 4 and 5 so that they sandwich the magnets 4 and 5 in the axial direction. Each of the outer diameters of the coils 2 and 3 is substantially the same as each of the outer diameters of the magnets 4 and 5.

The reference numerals 18 and 19 denote a first stator and a second stator respectively, both of which are made of soft magnetic material. The first stator 18 and the second stator 19 are disposed so that the phase of the first stator 18 is the same as that of the second stator 19. Each of the first stator 18 and the second stator 19 is composed of an outer sheath and an inner sheath. The coil 2 is provided between the outer sheath and inner sheath of the first stator 18. Energization of this coil 2 excites the first stator 18.

The outer sheath and inner sheath of the first stator 18 form the outer magnetic poles 18a and 18b and the inner magnetic poles 18c and 18d in their ends respectively. The magnetic poles 18c and 18d are formed so that each of the phases of the inner magnetic poles 18c and 18d is the same as the other having a shift of 360/(n/2), that is 180 degrees.

The outer magnetic pole 18a is oppposingly arranged with respect to the inner magnetic pole 18c and the outer magnetic pole 18b is oppposingly arranged with respect to the inner magnetic pole 18d.

The outer magnetic poles 18a and 18b and the inner magnetic poles 18c and 18d of the first stator are provided so that the poles 18a and 18b and the poles 18c and 18d are opposed to the outer peripheral surface and the inner peripheral surface of the one end side of the magnet 4, respectively to sandwich the one end side of the magnet 4. Further, one end portion of the rotating shaft 7 is rotatably fitted into a hole 18e of the first stator 18.

The coil 3 is provided between the outer sheath and inner sheath of the first stator 19. Energization of this coil 3 excites the second stator 19. The outer sheath and inner sheath of the second stator 19 form the outer magnetic poles 19a and 19b and the inner magnetic poles 19c and 19d in their distal end, respectively. The magnetic poles 19c and 19d are formed so that each of the phases of the inner magnetic poles 19c and 19d is the same as the other having the shift of 360/(n/2), that is 180 degrees. The outer magnetic pole 19a is oppposingly arranged with respect to the inner magnetic pole 19c and the outer magnetic pole 19b is oppposingly arranged with respect to the inner magnetic pole 19d.

The outer magnetic poles 19a and 19b and the inner magnetic poles 19c and 19d of the second stator are provided so that the poles 19a and 19b and the poles 19c and 19d are opposed to the outer peripheral surface and the inner peripheral surface of the one end side of the magnet 5, respectively while sandwiching the one end side of the magnet 5. Further, the other end portion of the rotating shaft 7 is rotatably fitted into a hole 19e of the second stator 19.

Therefore, since the magnetic flux generated in the coil 2 passes across the magnet 4, which is a rotor, between the outer magnetic poles 18a and 18b and the inner magnetic poles 18c and 18d, the magnetic flux effectively acts on the magnet 4, and since the magnetic flux generated in the coil 3 passes across the magnet 5, which is a rotorr between the outer magnetic poles 19a and 19b and the inner magnetic poles 19c and 19d, the magnetic flux effectively acts on the magnet 5, which is a rotor, thereby enhancing the output of the motor.

The reference numeral 20 denotes a connecting ring made of non-magnetic material, as a cylindrical member. Grooves 20a and 20b are provided on the inner surface of the connecting ring 20. The outer magnetic poles 18a and 18b of the first stator 18 are fitted into the grooves 20a and 20b at another end, and the outer magnetic poles 19a and 19b of the second stator 19 are fitted into the grooves 20c and 20d. Such fitted portions are fixed with adhesive so that the first stator 18 and the second stator 19 are attached on the connecting ring 20.

The first stator 18 and the second stator 19 are fixed with predetermined gaps of inner projections 20e and 20f of the connecting ring 20 in a manner that the outer magnetic poles 18a and 18b and the inner magnetic poles 18c and 18d are opposed to each other, and also the outer magnetic poles 19a and 19b and the inner magnetic poles 19c and 19d are opposed to each other.

FIG. 2 is a cross-sectional view of the step motor according to the present invention, and FIGS. 4A to 4D are cross-sectional views taken along the line A—A of FIG. 2 and FIGS. 4E to 4H are cross-sectional views taken along the line B—B of FIG. 2. FIG. 4A and FIG. 4E are cross-sectional views at the same time, FIG. 4B and FIG. 4F are cross-sectional views at the same time, FIG. 4C and FIG. 4G are cross-sectional views at the same time and also FIG. 4D and FIG. 4H are cross-sectional views at the same time.

The operation of the step motor of the present invention will now be described. When the coils 2 and 3 are energized from the states of FIGS. 4A and 4E to excite the outer magnetic poles 18a and 18b of the first stator 18 as the N pole and the inner magnetic poles 18c and 18d of the first stator 18 as the S pole and also excite the outer magnetic poles 19a and 19b of the second stator 19 as the N pole and the inner magnetic poles 19c and 19d of the second stator 19 as the S pole, the magnet 1, which is a rotor, is rotated by 45° in a counterclockwise direction, resulting in the states shown in FIGS. 4B and 4F.

When the energization of the coil 3 is inverted to excite the outer magnetic poles 19a and 19b of the second stator 19 as the S pole and the inner magnetic poles 19c and 19d of the second stator 19 as the N pole and also excite the outer magnetic poles 18a and 18b of the first stator 18 as the N pole, and the inner magnetic poles 18c and 18d of the first stator 18 as the S pole, the magnet 1, which is a rotor, is further rotated by 45° in the counterclockwise direction, resulting in states shown in FIGS. 4C and 4G.

When the energization of the coil 2 is inverted to excite the outer magnetic poles 18a and 18b of the first stator 18 as the S pole and the inner magnetic poles 18c and 18d of the first stator 18 as the N pole and also excite the outer magnetic poles 19a and 19b of the second stator 19 as the N pole and the inner magnetic poles 19c and 19d of the second stator 19 as the S pole, the magnet 1, which is a rotor, is further rotated by 45° in the counterclockwise direction, resulting in states shown in FIGS. 4D and 4H. After that, by subsequently changing the energizing direction for the coils 2 and 3 as mentioned above, the magnet 1, which is a rotor, is rotated to a position corresponding to the energizing phase.

FIG. 5 is a graph of magnetic-pole changes of the outer magnetic poles 18a and 18b of the first stator and of the outer magnetic poles 19a and 19b of the second stator, which are generated by coil current, in the motor of the present invention, which is operated by the above-mentioned configuration. Each of the magnetic poles is changed as shown in FIG. 5 and rotors are rotated accordingly. The positional relationships between the stators and the rotors shown in FIGS. 4A to 4D and FIGS. 4E to 4H are shown by arrows in FIG. 5. That is, the point where both of the outer magnetic poles became N poles corresponds to FIGS. 4A and 4E, respectively. The point where the outer magnetic poles 18a and 18b of the first stator became the N pole and the point where the outer the magnetic poles 19a and 19b of the second stator became the S pole corresponds to FIGS. 4B and 4F, respectively. Also, the point where both of the outer magnetic poles became S poles corresponds to FIGS. 4C and 4G, respectively. Further, the point where the outer magnetic poles 18a and 18b of the first stator became the S pole and the outer the magnetic poles 19a and 19b of the second stator became the N pole corresponds to FIGS. 4D and 4H, respectively. In the following descriptions, the positional relationships between the stators and the rotors are described by angles showing the rotation positions of rotors as shown in FIG. 5.

Figure 6:
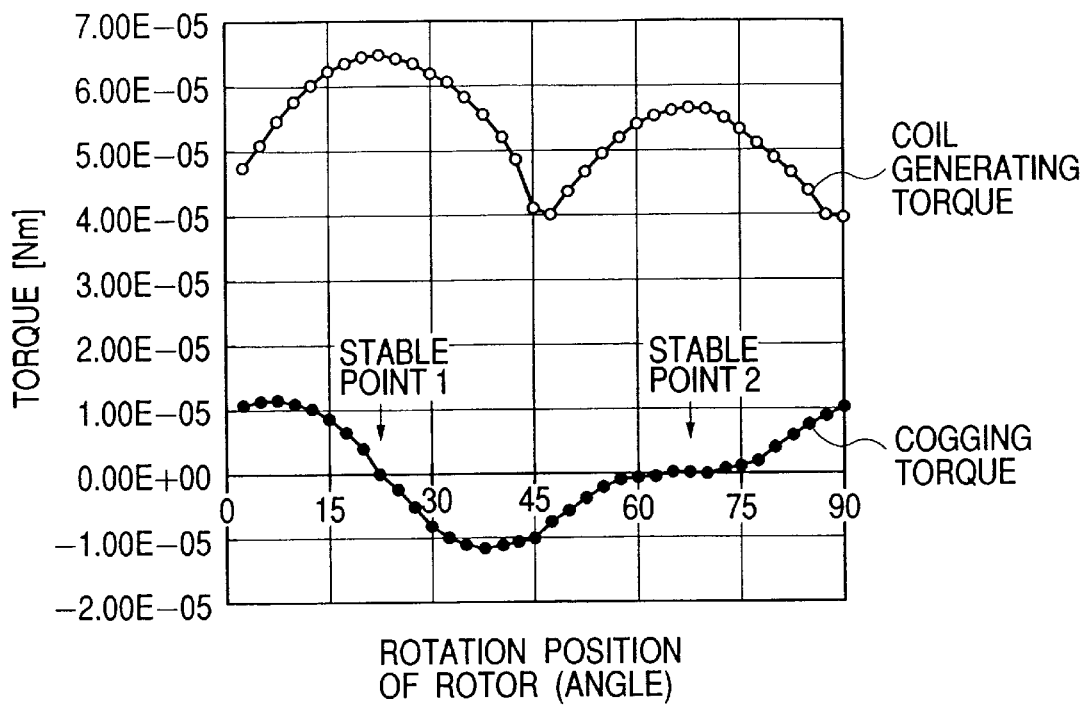
FIG. 6 is a view showing torque changes of the motor shown in FIG. 2.
Figure 7:
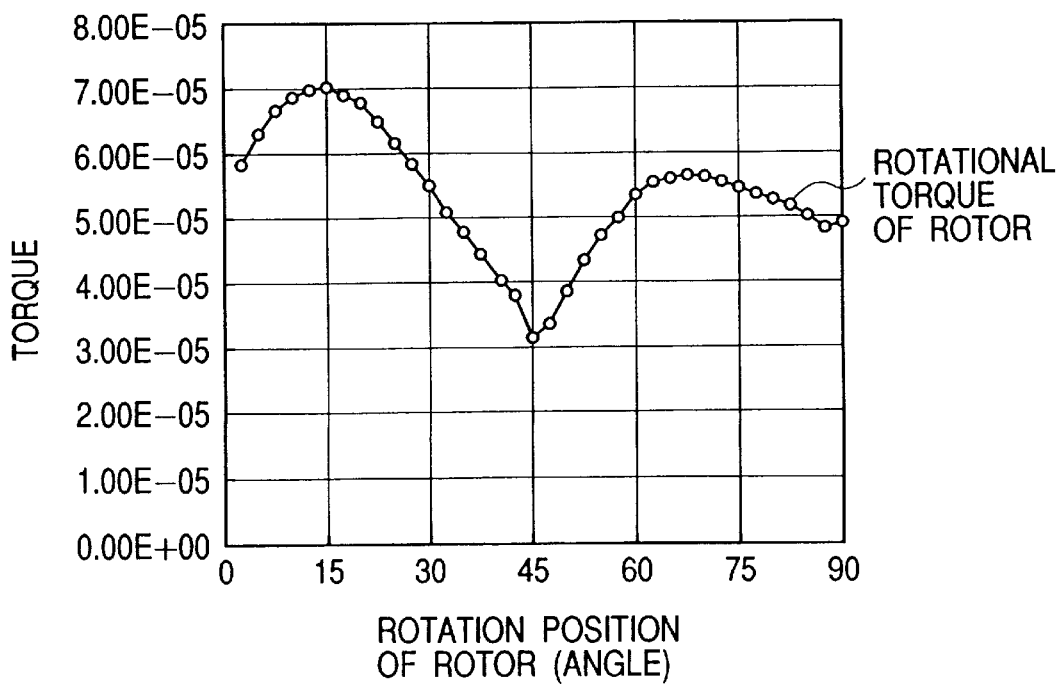
FIG. 7 is a view showing composite-torque changes of the motor shown in FIG. 2.

FIGS. 6 and 7 show the relationships between the rotation position of rotor and the torque in the motor having the above-mentioned configuration. In FIG. 6 each of the black dots represents the cogging torque, which is a force acting on the rotor when the rotor is rotated slowly without supplying the coil with current, and each of the white dots represents the torque-generated magnetic field generated by the coil. Further, FIG. 7 shows the torque obtained by adding the cogging torque to the torque generated by the coil magnetic field and the torque is a torque which finally acts as the rotation force of the rotor. The torques shown in FIGS. 6 and 7 were calculated by the finite-element method. Particularly, in the calculation, the torque of FIG. 7 and the cogging torque of FIG. 6 are obtained. Thus, the torque generated by the coil magnetic field as shown in FIG. 6 can be obtained by the difference between both torques. Also, the same results could be obtained by experiments with respect to the calculated results. That is, the fact that the motor torque becomes very small at 45 degrees of the rotation position of the rotor (torque minimum is small) as shown in FIG. 7, and that the torque at a rotor rotation position of 45 to 90 degrees is smaller than that at 0 to 45 degrees thereof (variation of torque is large) is confirmed by calculations and experiments.

It can be seen from FIG. 6 that the cause of the problem that the torque minimum value is small resides in the cogging torque, and that the cause of a large torque variation resides in the torque variation generated by the coil. Namely, when the rotation position of the rotor is in the range of 30 to 45 degrees, very large negative torque is acted on by cogging torque whereby the minimum value of torque becomes small. Alternatively, the coil-generating torque in the range of 45 to 90 degrees is smaller than that in the range of 0 to 45 degrees, resulting in the variation in rotor rotation torque becoming large.

It has been found that the problems of a small minimum value of torque and a large torque variation in the thus formed motor can be solved by providing a slight phase difference between the first and second stators. Before explaining the details of the solution of these problems, the causes of the occurrence of such problems will now be described in detail with reference to FIGS. 8A to 8D and FIG. 9.

As can be seen from the changes in cogging torque (black dots), the rotor exhibits stable states (states where the rotary force is not acted on) at two points shown by a stable point 1 and a stable point 2 in FIG. 6. The stable point 2 is not a stable point in the sense that when the rotor is slightly rotated, it returns to the original position. However, the stable point 2 is called as a stable point because the rotary force is not acted on.

FIGS. 8A to 8D show the positional relationships between the rotor and the stator at two stable points as shown in FIG. 6. FIG. 8A is a cross-sectional view taken along line A—A of FIG. 2 at the stable point 1 and FIG. 8B is a cross-sectional view taken along line B—B of FIG. 2 at the stable point 1. Further, FIG. 8C is a cross-sectional view taken along line A—A of FIG. 2 at the stable point 2 and FIG. 8D is a cross-sectional view taken along line B—B of FIG. 2 at the stable point 2. The stable point 1 is the rotation position of the rotor where the N pole is positioned at the inside of each of the outer magnetic poles 18a and 18b of the first stator and the S pole is positioned at the inside of each of the outer magnetic poles 19a and 19b of the second stator. Since in this state, the magnetic flux is apt to flow between the polarized layers 4b and 5a and between the polarized layers 4d and 5c through magnetic poles of the two stators and the air therebetween, an extremely stable state can be obtained. On the other hand, the stable point 2 is the rotation position of the rotor where the S pole is positioned at the inside of each of the outer magnetic poles 19a and 19b of the second stator, and also the S pole is positioned at the inside of each of the outer magnetic poles 19a and 19b of the second stator.

Since in this state, the flow of magnetic flux is not generated between the magnets 4 and 5, the stable point 2 is different from the stable point 1, resulting in an unstable state. Consequently, since the stable point 1 is extremely stable, the cogging torque is generated as shown in FIG. 6.

Figure 9:
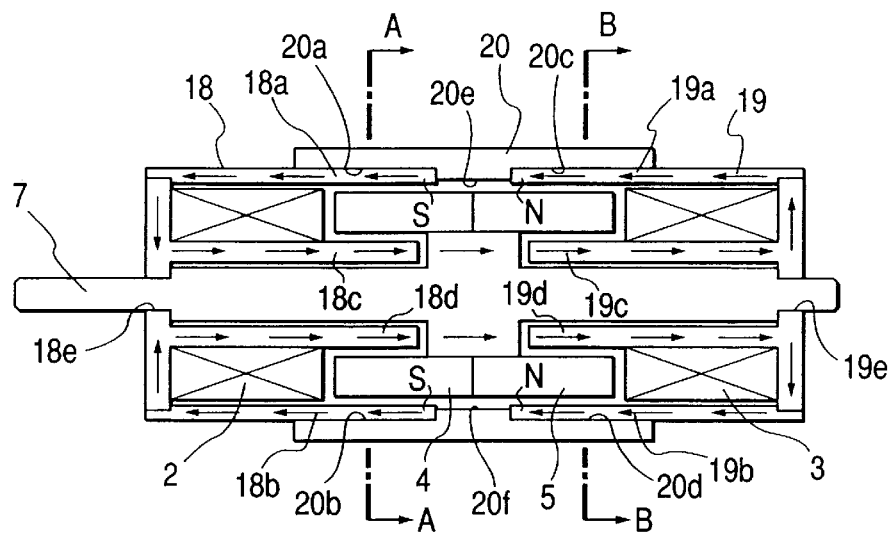
FIG. 9 is a view explaining the flow of magnetic flux generated by the coils shown in FIG. 2.

Then, the causes of the coil generating torque at the rotation position of 45 to 90 degrees becoming smaller as compared with that of 0 to 45 degrees will be described with reference to FIG. 9. FIG. 9 shows the flow of the magnetic flux that a coil generates at the rotation position of 45 to 90 degrees of the rotor. Since magnetic poles of the first stator and second stator, which are opposed to each other, i.e., magnetic poles 18a and 19a, magnetic poles 18b and 19b, magnetic poles 18c and 19c, and magnetic poles 18d and 19d, have opposite poles respectively, the magnetic flux of the first stators and second stators flows as shown by arrows in FIG. 9. As a result, the magnetic flux which flows across the magnets 4 and 5 is reduced, whereby the coil generating torque is decreased at this state. On the other hand, when the rotation position of the rotor is 0 to 45 degrees, the respective opposed magnetic poles of the first and second stators are the same magnetic poles. Thus, since no magnetic flux that flows between the first and second stators is generated, the decrease of such torque is not generated.

Taking the above descriptions into consideration, concrete Example 1 of the present invention is a method of improving the motor configured as mentioned above.

Figure 10:
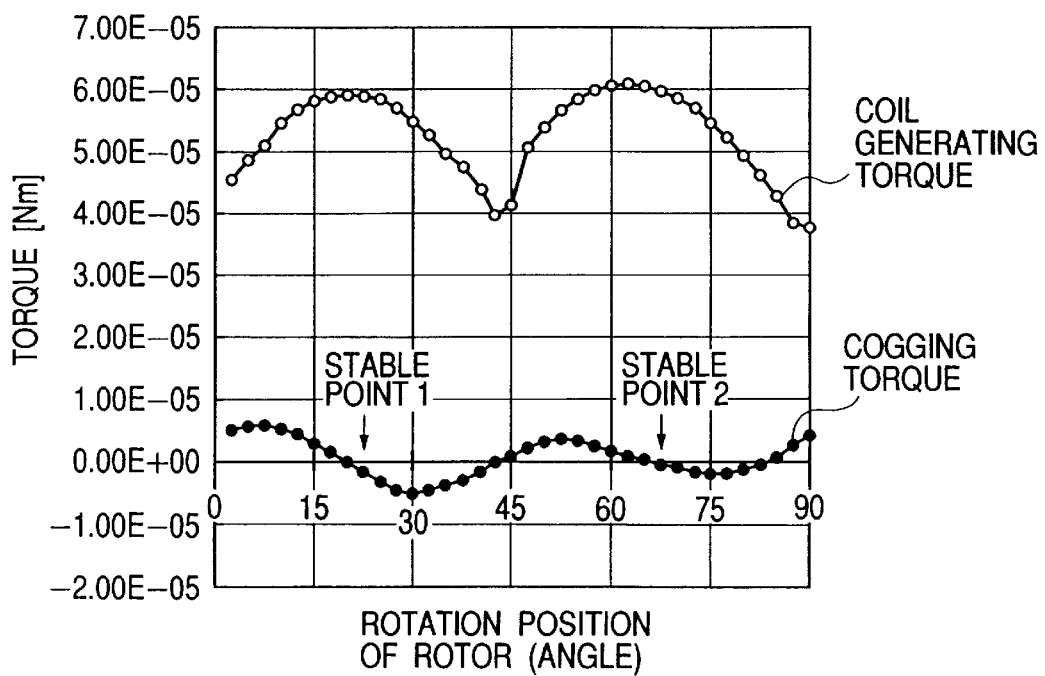
FIG. 10 is a view showing torque changes of the motor shown in FIGS. 3A and 3B.
Figure 11:
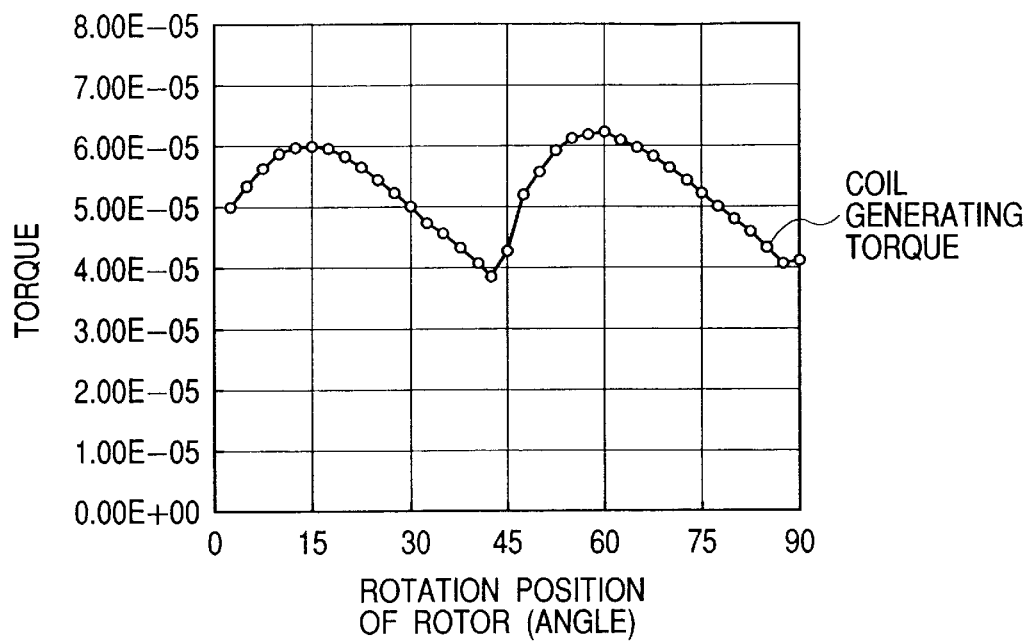
FIG. 11 is a view showing composite-torque changes of the motor shown in FIG. 10.

FIGS. 3A and 3B, FIG. 10 and FIG. 11 are views showing Example 1 of the present invention. Particularly, FIG. 3A is a cross-sectional view of the motor according to the invention taken along the line A—A of FIG. 2 and FIG. 3B is a cross-sectional view taken along the line B—B of FIG. 2. The basic configuration of the motor of the present invention is substantially the same as described above, except that the second stator is disposed circumferentially shifted by $\Delta\theta$ in a clockwise direction (when a counterclockwise direction is defined as positive, the phase is delayed by $\Delta\theta$). The relation between the rotation position of the rotor and torque where $\Delta\theta$ is six degrees is shown in FIGS. 10 and 11.

These figures correspond to FIGS. 6 and 7. In FIG. 10, each of the black dots represents the cogging torque, which is a force acting on the rotor when the rotor is rotated slowly without supplying the coil with current, and each of the white dots represents the torque generated by the magnetic field generated by the coil. Further, FIG. 11 shows the torque obtained by adding the cogging torque to the torque generated by the coil, the torque being one which finally acts as the rotary force of a rotor. Although the torques shown in FIGS. 10 and 11 were calculated by the finite-element method, the same results could be obtained by experiments.

FIG. 11 shows that although the torque is decreased when the rotation position of the rotor is 45 degrees and 90 degrees, smaller torque values at 45 degrees and 90 degrees (the value for 45 degrees) are larger than that in FIG. 7 (minimum value of torque is large) and the same torque for the rotation position of the rotor at 0 to 45 degrees can be obtained even in the range of 45 to 90 degrees (torque variation is small).

Further, it can be found from the comparison of FIG. 10 with FIG. 6 that the cause of the improvement of the minimum value of torque at the 45 degree rotation position of the rotor resides in the smallness of the cogging torque and the cause of the reduction in the torque variation resides in the decrease in the torque variation. That is, the minimum value of the cogging torque is about $-1.0\times10-5$ [Nm] in FIG. 6, which is a half of that in FIG. 10. On the other hand, the torque generated by the coil exhibits substantially the same changes at the rotation position of 0 to 45 degrees and 45 to 90 degrees. The width of the torque is smaller than that of FIG. 6.

Figure 14:
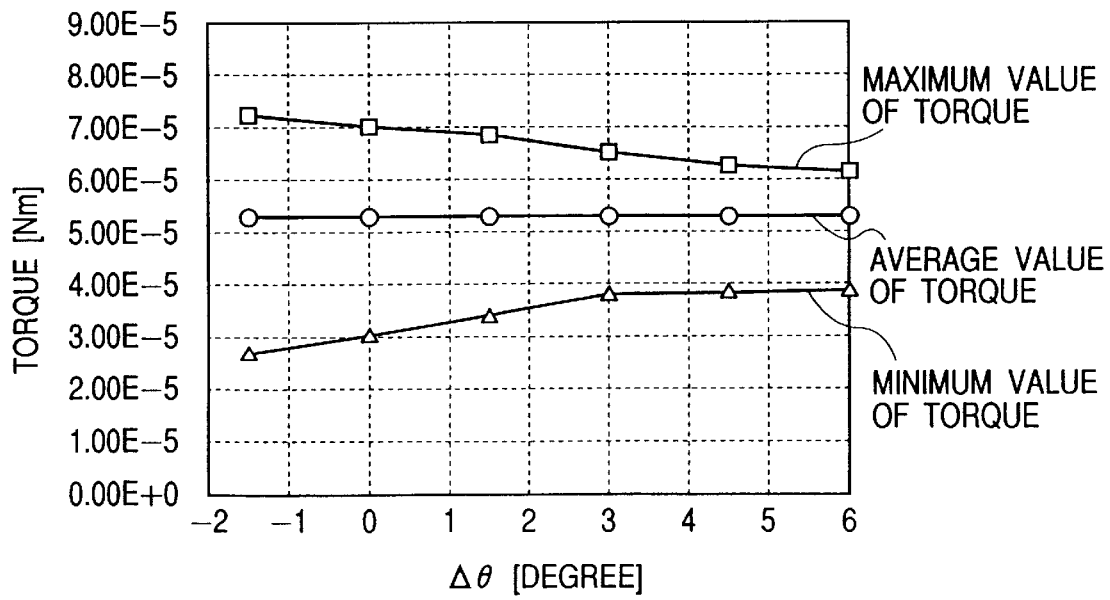
FIG. 14 is a view showing the torque obtained when the first and second stators are changed by a phase difference Δθ.

It is confirmed that the averages of rotational torque of the rotors between the rotor rotation positions of 0 to 90 degrees are the same as in FIG. 7 and FIG. 11, although it is described below with reference to FIG. 14.

Thus, the cause the such improved torque variation will be then described with reference to FIGS. 3A and 3B, 12A to 12D and 13A to 13D.

FIGS. 3A and 3B show the positional relationships between the stator and the magnet at the stable point 1 of FIG. 10. As in the case of FIGS. 8A and 8B, the magnetic flux easily flows between the polarized layers 4b and 5a and between the polarized layers 4d and 5c through outer magnetic poles 18a and 19a and the air therebetween, resulting in a stable state. However, since the positions of the first and second stators are slightly shifted, the magnetic resistance therebetween is large so that extremely stable states, as shown in FIGS. 8A and 8B, are not obtained. As the result, the cogging torque becomes small as shown in FIG. 10, as compared with FIG. 6.

FIGS. 12A to 12D and FIGS. 13A to 13D show the positional relationships between the stator and the magnet at the respective rotation positions of the rotor of 22.5 degrees and 67.5 degrees. FIGS. 12A and 12B and FIGS. 13A and 13B are states before the present invention is applied ($\Delta\theta=0$ degree) and FIGS. 12C and 12D and FIGS. 13C and 13D according to the present invention ($\Delta\theta=6$ degrees). Further, FIGS. 12A and 12C and FIGS. 13A and 13C are cross-sectional views taken along the line A—A and FIGS. 12B and 12D and FIGS. 13B and 13D are cross-sectional views taken along the line B—B.

In the rotation position of the rotor of FIGS. 12A to 12D, the outer magnetic poles 18a and 18b of the first stator 18 and the outer magnetic poles 19a and 19b of the second stator 19 are N poles, and the inner magnetic poles 18c and 18d of the first stator 18 and the inner magnetic poles 19c and 19d of the second stator 19 are S poles. When FIGS. 12A and 12B are compared with FIGS. 12C and 12D, it can be found that the torque that acts on the magnet 4 positioned at the first stator side is the same. However, it can be found that since the angles formed between the central axes of the polarized layer 5a and the magnetic pole and between central axes of the polarized layer 5c and the magnetic pole in FIGS. 12C and 12D (22.5 degrees $-\Delta\theta$) are smaller than in FIGS. 12A and 12B (22.5 degrees), the torque that acts on the magnet 5 positioned at the second stator side is small. As a result, the torque that acts on the rotor is smaller in the rotor rotation position of $\Delta\theta=6$ degrees.

Figures 13A, 13B, 13C, 13D:
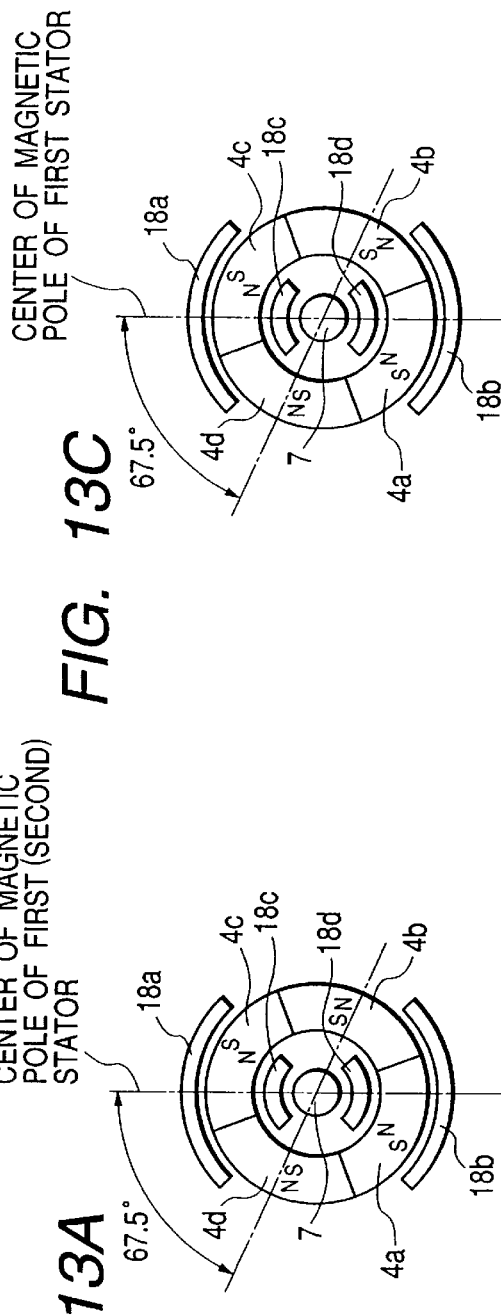
FIGS. 13A, 13B, 13C and 13D are views obtained when the positions of the rotor of the motor are as shown in FIGS. 12A to 12D.
Figure 16:
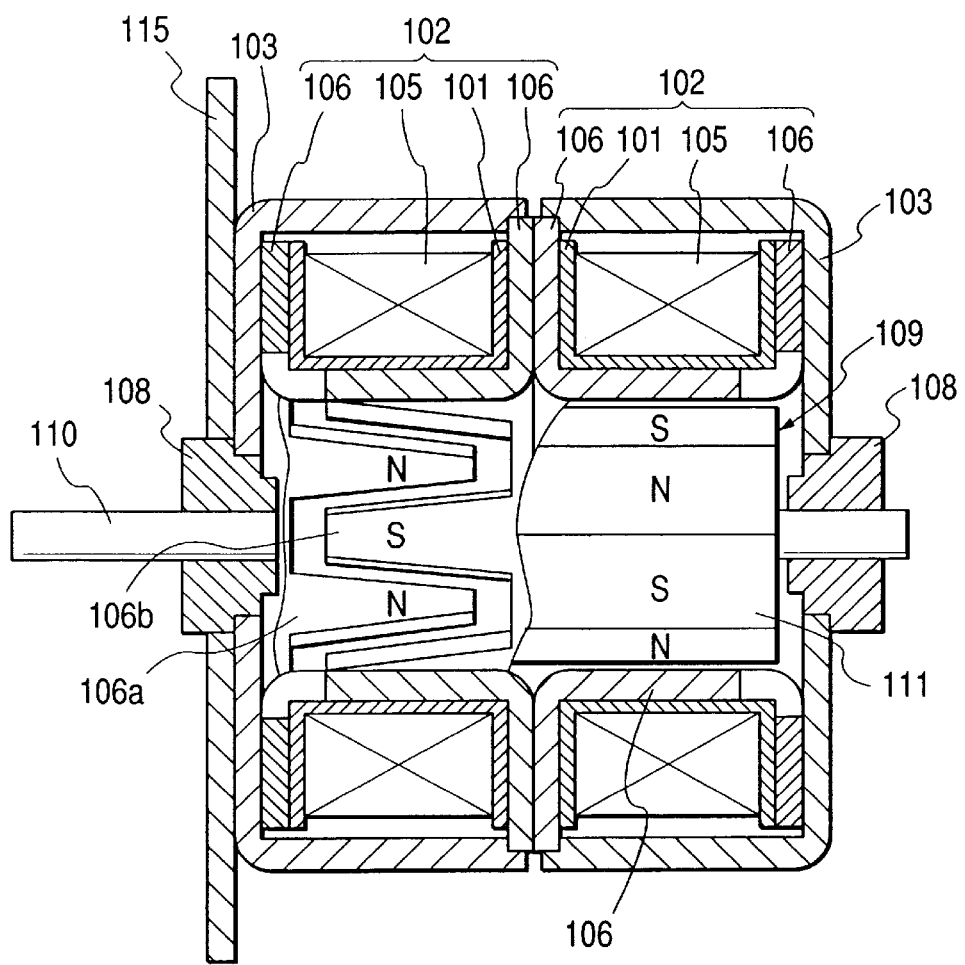
FIG. 16 is a cross-sectional view showing a conventional step motor.
Figure 17:
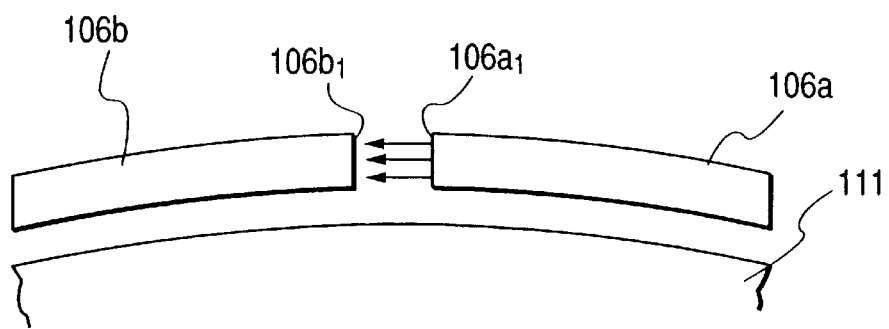
FIG. 17 is a view explaining the magnetic flux of the conventional step motor shown in FIG. 16.

In the rotation of the rotor of FIGS. 13A to 13D, the outer magnetic poles 18a and 18b of the first stator 18 and the outer magnetic poles 19a and 19b of the second stator 19 are N poles, and the inner magnetic poles 18c and 18d of the first stator 18 and the inner magnetic poles 19c and 19d of the second stator 19 are S poles. When FIGS. 13A and 13B are compared with FIGS. 13C and 13D, it can be found that the torque that acts on the magnet 4 positioned at the first stator side is the same. However, it can be found that since the angles formed between the central axes of the polarized layer 5a and the magnetic pole and between the central axes of the polarized layer 5c and the magnetic pole in FIGS. 13C and 13D (22.5 degrees $+\Delta\theta$) are larger than in FIGS. 13A and 13B (22.5 degrees), the torque that acts on the magnet 5 positioned at the second stator side is large. As a result, the torque that acts on the rotor is larger than in the rotor rotation position of $\Delta\theta=6$ degrees.

For the above-mentioned reasons, the torque that is generated by the coil of FIG. 6 becomes small in the range of 0 to 45 degrees for the rotation position of the rotor and becomes large in the range of 45 to 90 degrees for the rotation position of the rotor by changing $\Delta\theta$ from 0 to 6 degrees. As a result, as shown in FIG. 10, the torque that is generated by the coil exhibits the same changes in the range of 0 to 45 degrees for the rotation position of the rotor and in the range of 45 to 90 degrees for the rotation position of the rotor, with the amplitude of the torque changes being small as compared with that of FIG. 6.

In this case, this explanation was made using $\Delta\theta$ as 6 degrees. Changes of torque in a case where $\Delta\theta$ was changed are shown in FIG. 14. In FIG. 14, the mark O represents an average of torque in one cycle (for example, the rotation position of the rotor of 0 to 90 degrees in FIGS. 7 and 11), the mark $\Delta$ represents the minimum of torque and the mark $\square$ represents the maximum of torque. As can be seen from FIG. 14, the minimum of torque is improved by making $\Delta\theta$ more than 0 degree, but a $\Delta\theta$ of three degrees or more does not change the torque significantly. On the other hand, the average value of the torque is not changed. When $\Delta\theta$ is above 10 degrees (not shown) the rotational force was decreased because of the incapability of performing according to the operation principle of the motor, which was described in FIGS. 4A to 4H. To surely improve the performance of the motor, $\Delta\theta$ may be preferably from 2 to 10 degrees.

As a general method of controlling the motor, torque variation a skew cam be used, in which the boundary between the N/S of the rotor magnet is non-parallel to an end of a stator yoke. The motor of the present invention is different from the skew in that in the present invention a stator 19 is shifted by $\Delta\theta$ while the end of the boundary between N/S is maintained parallel with respect to rotor magnets 4 and 5, the phase of the rotor magnets 4 and 5 are positioned and phase shifted by 45 degrees and one of shifts of the stator 19 is defined.

EXAMPLE 2

In Example 1, the variation of the torque during rotation of the rotor was improved by providing a slight phase difference between the arrangement of the first and second stators. In Example 2, the variation of torque is improved by changing the phase differences of two magnets 4 and 5, instead of providing a phase difference between the arrangement of the stators.

FIGS. 15A and 15B and FIGS. 15C and 15D are views for explaining Example 2 and show positional relationships between the stator and the magnet in which the rotation positions of the rotors are 22.5 degrees and 67.5 degrees respectively. FIGS. 15A to 15D correspond to FIGS. 12A to 12D and FIGS. 13A to 13D. FIGS. 15A and 15C are cross-sectional views taken along the line A—A of FIG. 2, and FIGS. 15B and 15D are cross-sectional views taken along the line B—B of FIG. 2. The reference numerals in Example 2 are the same as in Example 1. In Example 2, a magnet 5 is positioned while the phase is circumferentially shifted by 45 degrees $+\Delta\theta$ in a counterclockwise direction with respect to the magnet 4 (phase is advanced by 45 degrees $+\Delta\theta$ while defining the counterclockwise direction as positive).

In the rotation position of the rotor of FIGS. 15A and 15B, the outer magnetic poles 18a and 18b of the first stator 18 and the outer magnetic poles 19a and 19b of the second stator 19 are N poles, and the inner magnetic poles 18c and 18d of the first stator 18 and the inner magnetic poles 19c and 19d of the second stator 19 are S poles. When FIGS. 15A and 15B are compared with FIGS. 12A and 12B, it can be found that the torque that acts on the magnet 4 positioned at the first stator side is the same. However, it can be found that since the angles formed between the central axes of the polarized layer 5a and the magnetic pole and between the central axes of the polarized layer 5c and the magnetic pole in FIGS. 15A and 15B (22.5 degrees $-\Delta\theta$) are smaller than in FIGS. 12A and 12B (22.5 degrees), the torque that acts on the magnet 5 positioned at the second stator side is small. As a result, the torque that acts on the rotor is smaller than in the phase shift of magnet of 45 degrees $+\Delta\theta$ for the rotation position of the rotor.

In the rotation position of the rotor of FIGS. 15C and 15D, the outer magnetic poles 18a and 18b of the first stator 18 and the outer magnetic poles 19c and 19d of the second stator 19 are N poles, and the inner magnetic poles 18c and 18d of the first stator 18 and the inner magnetic poles 19a and 19b of the second stator 19 are S poles. When FIGS. 15C and 15D are compared with FIGS. 12C and 12D, it can be found that the torque that acts on the magnet 4 positioned at the first stator side is the same. However, it can be found that since the angles formed between the central axes of the polarized layer 5a and the magnetic pole and between the central axes of the polarized layer 5c and the magnetic pole in FIGS. 15C and 15D (22.5 degrees $+\Delta\theta$) are larger than in FIGS. 12C and 12D (22.5 degrees), the torque that acts on the magnet 5 positioned at the second stator side is large. As a result, the torque that acts on the rotor is larger than in the phase shift of magnet of 45 degrees $+\Delta\theta$ for the rotation position of rotor.

From the above-mentioned reasons, the torque that is generated by the coil of FIG. 6 becomes small in the range of 0 to 45 degrees for the rotation position of the rotor and becomes large in the range of 45 to 90 degrees for the rotation position of the rotor, by changing 45 degrees to 45 degrees $+\Delta\theta$ for the phase difference of the magnet. As a result, as shown in FIG. 10, the torque that is generated by the coil of FIG. 10 exhibits the same changes in the range of 0 to 45 degrees for the rotation position of the rotor and in the range of 45 to 90 degrees for the rotation position of the rotor, with the range of the torque changes being small as compared with that of FIG. 6. In this case, the phase is circumferentially shifted by $(45+\Delta\theta)$ degrees in a counterclockwise direction with respect to magnets 4 and 5.

According to the above-mentioned reason, the rotor is smoothly rotated by the use of the invention of Example 2.

Two magnets 4 and 5 described above are generally prepared by polarizing one columnar high magnetic material. Thus, it is easy to prepare a magnet in which a phase is shifted by $\Delta\theta$. Therefore, according to Example 2, it is not necessary to position the first and second stators, one of which is shifted by $\Delta\theta$ in the phase from each other, which is a delicate control operation for assembling the motor, whereby productivity and yield are advantageously increased.

There is described herein the fact that the phase difference between magnets 4 and 5 is $\Delta\theta$. However, according to the study of the $\Delta\theta$ by the present inventors, it has been found that although $\Delta\theta$, which is larger than 0 degree, is effective in Example 2 as in Example 1, the $\Delta\theta$ that is particularly in the range of 2 to 10 degrees is particularly effective.

EXAMPLE 3

In Examples 1 and 2, an example of a motor in which the magnet 5 has a phase which is advanced by 45 degrees (=180/n, n=4) with respect to the magnet 4 and the second stator has the same phase as the first stator, was described. However, a motor having the configuration in Example 3, (which is the same type motor in which a stator, a coil and a magnet are coaxially arranged in such order) is rotated when the θ1+θ2 satisfies 180/n (n is the number of poles of the magnet mentioned-above), wherein an advanced phase angle of the magnet 5 with respect to magnet 4 is defined as θ1 and a phase angle of lag of the second stator with respect to the first stator is defined as θ2. Thus, the present invention can be applied even to such a common type motor. If the phase shift angle θ1+θ2 is set to 180/n degrees +Δθ, the variation of the rotation torque can be decreased by a similar principle mentioned-above. As a result, the rotation of the rotor is smoothly performed. If the Δθ is set to 0 degree or more as in the above-mentioned examples, a motor is effectively drived. Particularly, if the Δθ is in the range of 8/n to 40/n degrees (that is θ1+θ2 is in the range of 188/n to 220/n), it was found to be particularly effective.

In each of Examples 1 to 3, the outer peripheral surface of the magnet is circumferentially divided into n surfaces to alternately polarize the divided surfaces to S and N poles, and the inner peripheral surface of the magnet is circumferentially divided into n surfaces to alternately polarize the divided surfaces to S and N poles, which are different from the adjacent outer surfaces. However, in the present invention only outer peripheral surfaces of the magnet may be circumferentially divided into n surfaces to alternately polarize the divided surfaces to S and N poles.

As described above in detail, according to the present invention, by minutely changing the phase lag between two magnets and also the phase lag between two stators, a compact motor having a large torque and smooth rotation can be obtained.

What is claimed is:

1. A motor comprising:
   a magnet which is cylindrically formed, having a first polarized layer, in which at least the outer peripheral surface is circumferentially divided into n parts so that the n parts are alternately polarized to different poles, and a second polarized layer, in which at least the outer peripheral surface is circumferentially divided into n parts so that the n parts are alternately polarized to different poles, the advance phase angle being set to θ1 with respect to the first polarized layer;
   first and second coils axially provided with respect to said magnet, said first and second coils being positioned coaxial with said magnet;
   a first outer magnetic pole excited by said first coil, said first outer magnetic pole facing the outer peripheral surface on one end side of said magnet;
   a first inner magnetic pole excited by said first coil, said first inner magnetic pole facing the inner peripheral surface on the one end side of said magnet, said first outer magnetic pole forming a first stator together with said first outer magnetic pole;
   a second outer magnetic pole excited by said second coil, said second outer magnetic pole facing the outer peripheral surface on the other end side of said magnet;
   a second inner magnetic pole excited by said second coil, said second inner magnetic pole facing the inner peripheral surface on the other end side of said magnet, said second inner magnetic pole forming a second stator together with said second outer magnetic pole, said first and second polarized layers and said first and second stators are positioned so that θ1+θ2 are larger than 180/n degrees, wherein the phase lag angle of said second stator with respect to said first stator is θ2.

2. A motor according to claim 1, wherein said Δ1+θ2 is 188/n degrees or more, and 220/n degrees or less.

3. A motor according to claim 1, wherein said θ1 is set to 180/n degrees and θ2 is set to a range of 8/n degrees to 40/n degrees.

4. A motor according to claim 1, wherein said first outer magnetic pole of said first stator and said second outer magnetic pole of said second stator are connected with a cylindrical connecting member.

5. A motor according to claim 1, wherein the inner peripheral surfaces of said first and second polarized layers are alternately polarized to different poles from each other while being circumferentially divided into n parts respectively, and are polarized to different poles from adjacent outer peripheral surfaces.

6. A motor comprising:
   a cylindrically formed magnet, said magnet having a first polarized layer, which at least the outer peripheral surface is circumferentially divided into n parts so that n parts are alternately polarized to different poles, and a second polarized layer, win which at least the outer peripheral surface is circumferentially divided into n parts to that the n pats are alternately polarized to different poles, said second polarized layer being shifted by the phase angle of 180/n degrees with respect to said first layer at the adjacent position in the axial direction;
   first and second coils axially provided with respect to said magnet, said first and second coils being positioned coaxial with said magnet;
   a first outer magnetic pole excited by said first coil, said first outer magnetic pole facing the outer peripheral surface on one end side of said magnet;
   a first inner magnetic pole excited by said first coil, said first inner magnetic pole facing the inner peripheral surface on the one end side of said magnet, said first outer magnetic pole forming a first stator together with said first outer magnetic pole;
   a second inner magnetic pole excited by said second coil, said second outer magnetic pole facing the outer peripheral surface of the other end of said magnet;
   a second inner magnetic pole excited by said second coil, said second inner magnetic pole facing the inner peripheral surface on the other end side of said magnet, said second inner magnetic pole forming a second stator together with said second outer magnetic pole, wherein the phase difference between said first and second stators is Δθ.

7. A motor according to claim 6, wherein said Δθ is set to a angle of 8/n degrees to 40/n degrees.

8. A motor according to claim 6, wherein the inner peripheral surfaces of said first and second polarized layers are alternately polarized to different poles from each other while being circumferentially divided into n parts respectively, and are polarized to different poles from adjacent outer peripheral surfaces.

9. A motor comprising:
   a cylindrically formed magnet, said magnet having a first polarized layer, in which at least the outer peripheral surface is circumferentially divided into n parts so that the n parts are alternately polarized to different poles, and a second polarized layer, in which at least the outer peripheral surface is circumferentially divided into n parts so that the n parts are alternately polarized to different poles, said second polarized layer being shifted by the phase angle of 180/n degrees and further by a phase of $\Delta\theta$ respect to said first layer at the adjacent position in the axial direction;

first and second coils axially provided with respect to said magnet, said first and second coils being positioned coaxial with said magnet;

a first outer magnetic pole excited by said first coil, said first outer magnetic pole facing the outer peripheral surface on one end side of said magnet;

a first inner magnetic pole excited by said first coil, said first outer magnetic pole facing the inner peripheral surface on the one end side of said magnet, said first outer magnetic pole forming a first stator together with said first outer magnetic pole;

a second outer magnetic pole excited by said second coil, said second outer magnetic pole facing the outer peripheral surface on the outer end side of said magnet;

a second inner magnetic pole excited by said second coil, said second inner magnetic pole facing the inner peripheral surface on the other end side of said magnet, said second inner magnetic pole forming a second stator together with said second outer magnetic pole, said second stator and said first stator having the same phase.

10. A motor according to claim 9, wherein said $\Delta\theta$ is set to a range of 8/n degrees to 40/n degrees.

11. A motor according to claim 9, wherein the inner peripheral surfaces of said first and second polarized layers are alternately polarized to different poles from each other while being circumferentially divided into n parts respectively, and are polarized to different poles from adjacent outer peripheral surfaces.

* * * * *

UNITED STATES PATENT AND TRADEMARK OFFICE
CERTIFICATE OF CORRECTION

PATENT NO. : 6,172,440 B1
DATED : January 9, 2001
INVENTOR(S) : Toyoshige Sasaki et al.

It is certified that error appears in the above-identified patent and that said Letters Patent is hereby corrected as shown below:

Column 1,
Line 6, "the" should be deleted.
Line 17, "to" (first occurrence) should read -- into --.
Line 32, "106a*l*" should read -- 106a1 --.
Line 33, "106b*l*" should read -- 106b1 --.
Line 38, "as" should read -- as in --.

Column 2,
Line 23, "invention." should read -- invention; --.
Line 63, "Example 1" should be deleted.

Column 4,
Line 38, "rotorr" should read -- rotor, --.

Column 5,
Line 49, "outer the" should read -- outer --.

Column 8,
Line 9, "cause" should read -- cause of --.

Column 9,
Line 32, "cam" should read -- can --.

Column 11,
Line 6, "θ1+θ2" should read -- θ1 + θ2 --.
Line 7, "mentioned-above)," should read -- mentioned above), --.
Line 12, "θ1+θ2" should read -- θ1 + θ2 --.
Line 14, "mentioned-above." should read -- mentioned above. --.
Line 15, "Δθis" should read -- Δθ is --.
Line 17, "drived." should read -- driven. --.
Line 18, "θ1+θ2" should read -- θ1 + θ2 --.
Line 60, "magnet;" should read -- magnet; and --.

UNITED STATES PATENT AND TRADEMARK OFFICE
CERTIFICATE OF CORRECTION

PATENT NO. : 6,172,440 B1
DATED : January 9, 2001
INVENTOR(S) : Toyoshige Sasaki et al.

It is certified that error appears in the above-identified patent and that said Letters Patent is hereby corrected as shown below:

Column 12,
Line 3, "$\Delta 1+\theta 2$" should read -- $\theta 1 + \theta 2$ --.
Line 20, "which" should read -- in which --.
Line 23, "win" should read -- in --.
Line 25, "to" (first occurrence) should read -- so -- and "pats" should read -- parts --.
Line 43, "magnet;" should read -- magnet; and --.
Line 52, "a" should read -- an --.

Column 13,
Line 3, "respect" should read -- with respect --.
Line 18, "magnet;" should read -- magnet; and --.

SHEET 9 OF THE DRAWINGS,
In Figures 12 A-D, "DEGREE" should read -- DEGREES --.

SHEET 10 OF THE DRAWINGS,
In Figures 13 A-D, "DEGREE" should read -- DEGREES --.

Signed and Sealed this

Thirteenth Day of November, 2001

Attest:

NICHOLAS P. GODICI
Attesting Officer    Acting Director of the United States Patent and Trademark Office